June 2, 1931. A. GAMMELL 1,808,406
SORTING AND DISTRIBUTING MACHINE
Filed April 12, 1928 11 Sheets-Sheet 4
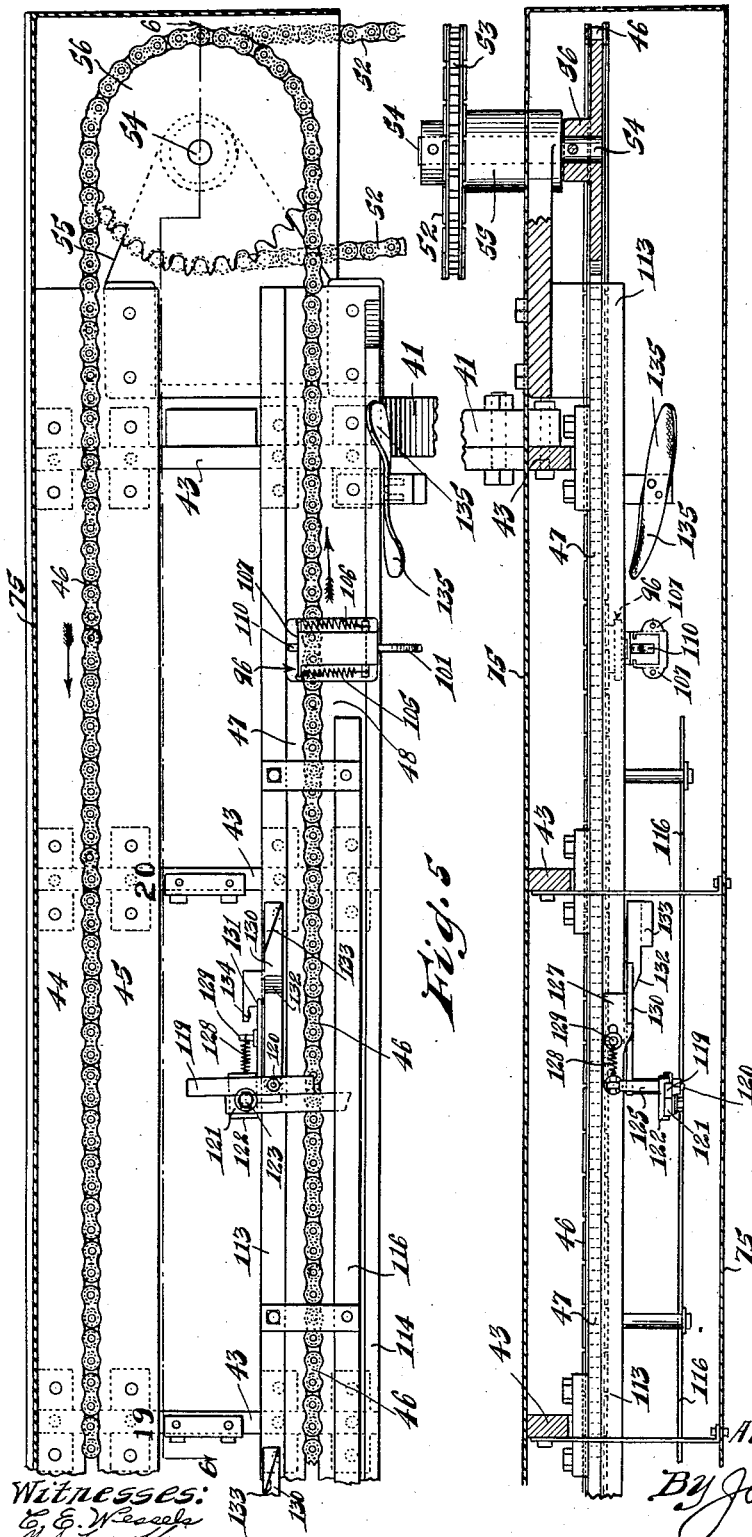
Inventor:
Alexander Gammell,
By Joshua R. H. Potts
his Attorney.

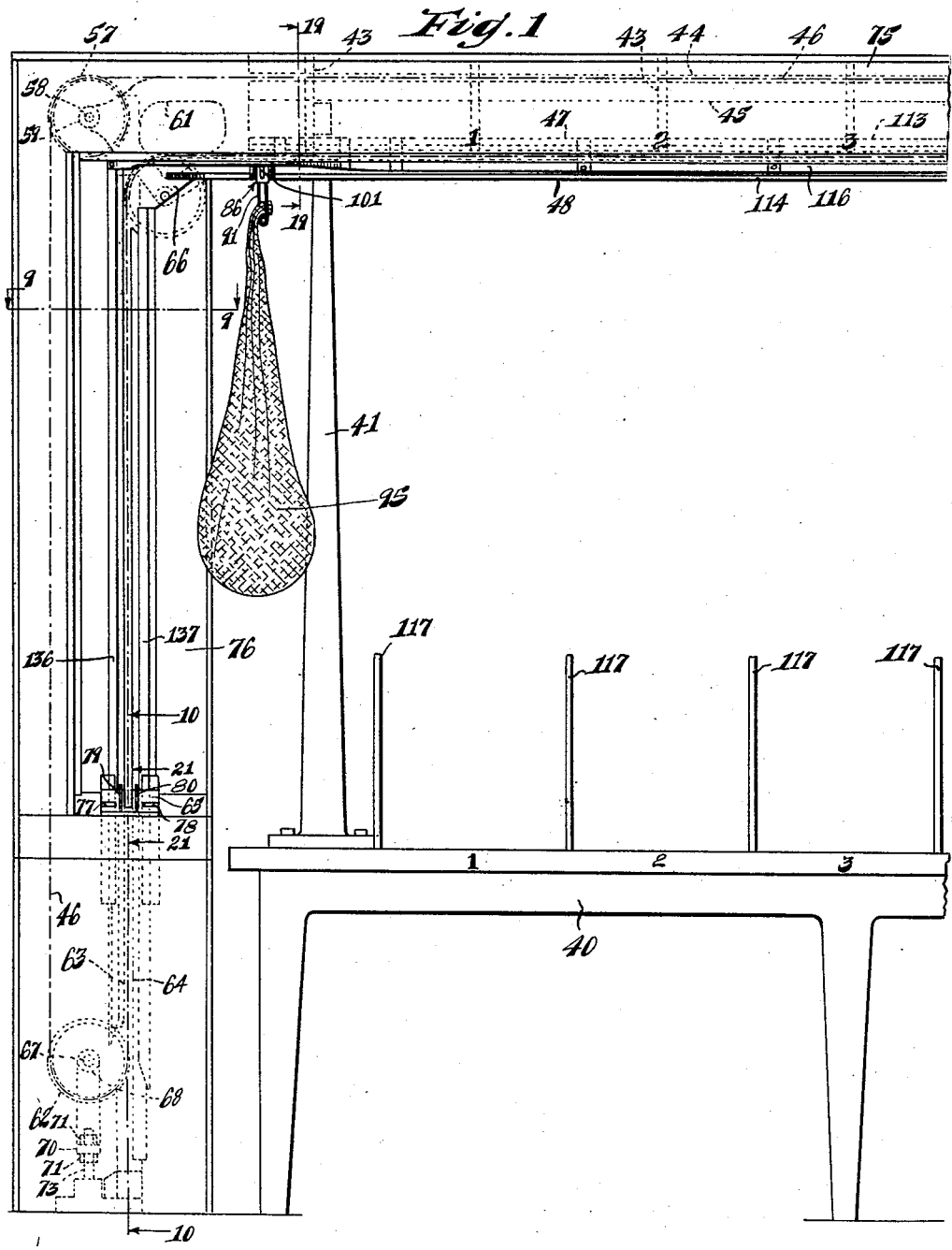

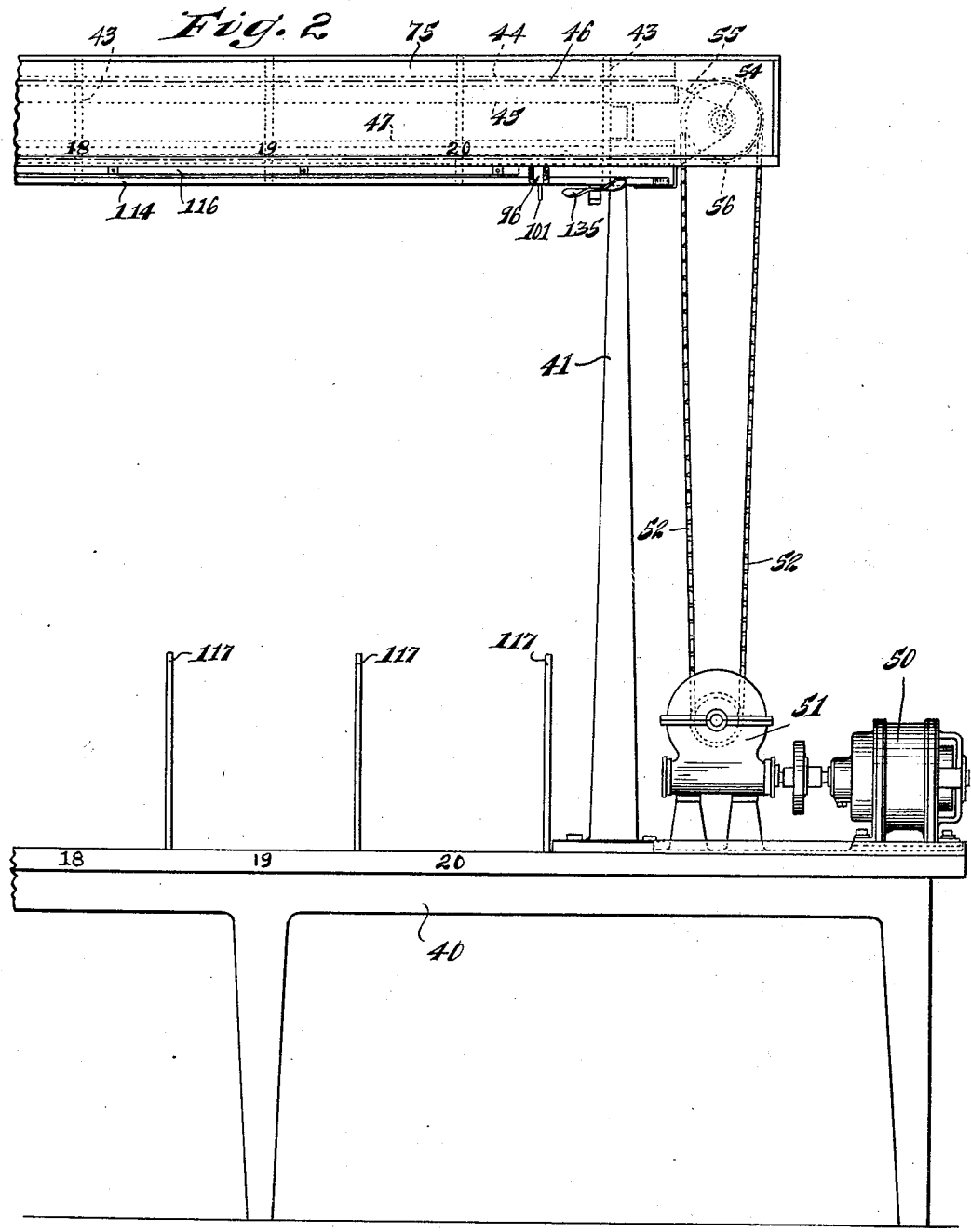

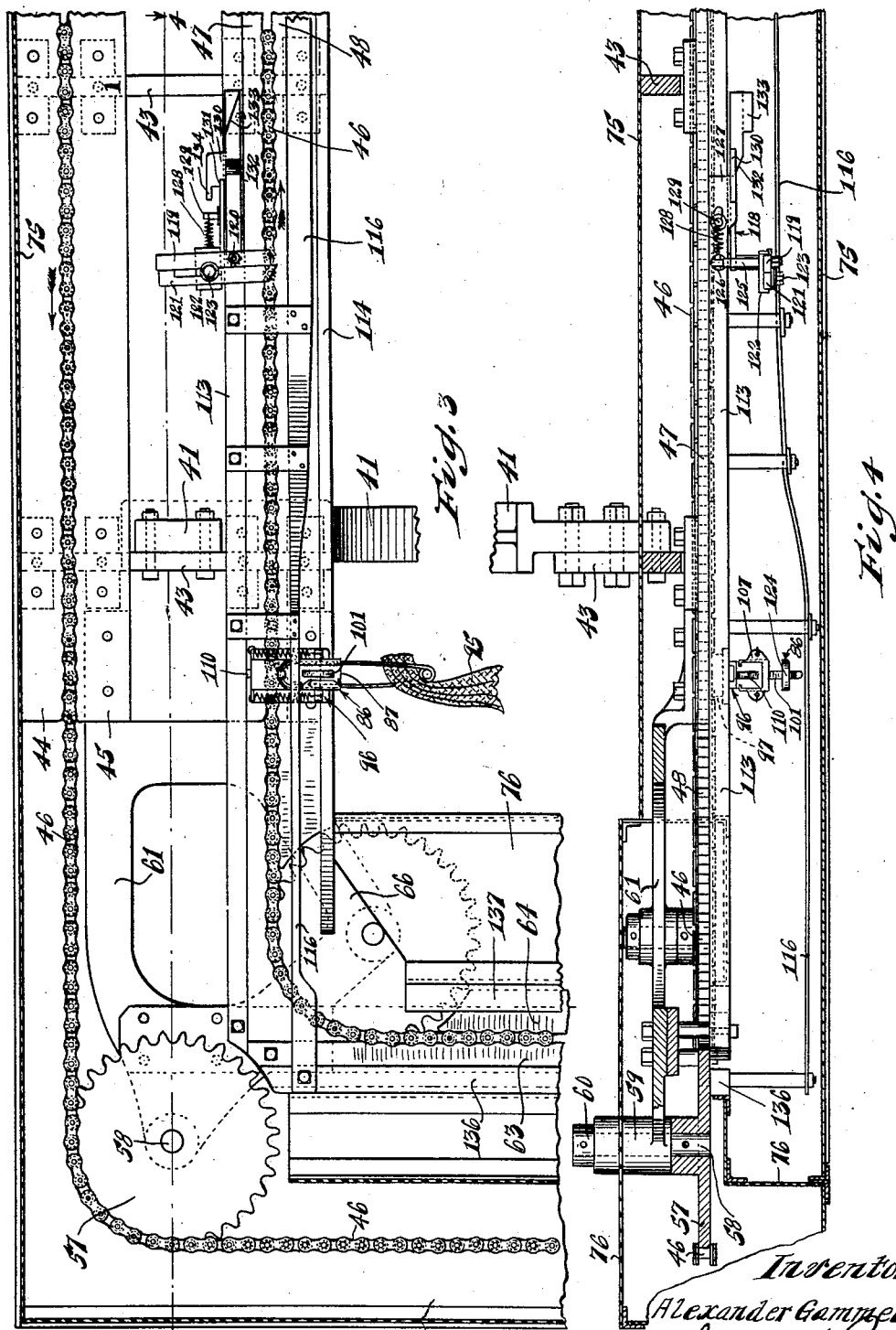

June 2, 1931.  A. GAMMELL  1,808,406
SORTING AND DISTRIBUTING MACHINE
Filed April 12, 1928   11 Sheets-Sheet 5
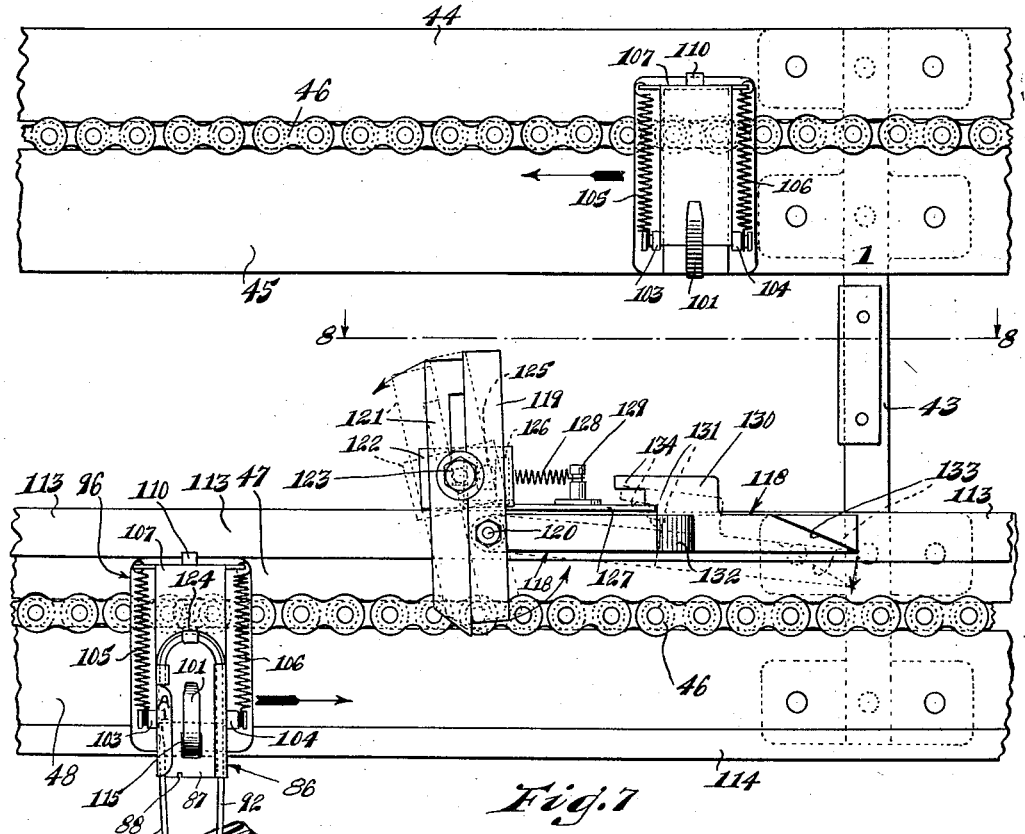
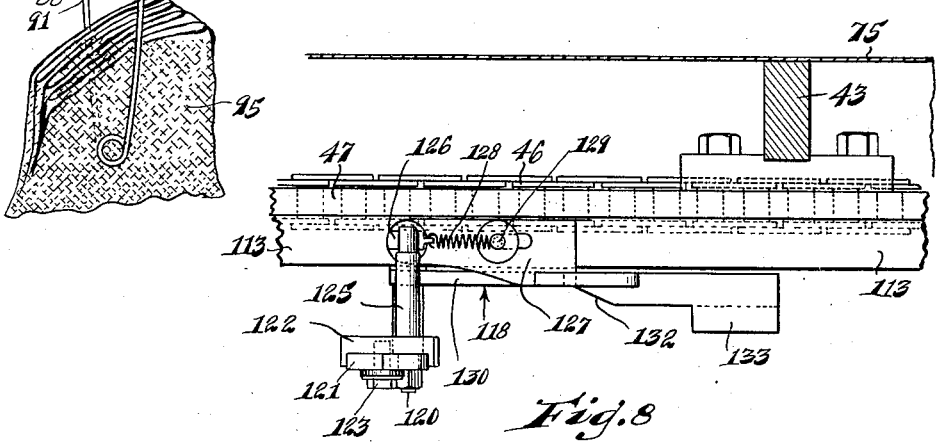
Witnesses:
C. E. Wessels
H. S. Laughlin
Inventor:
Alexander Gammell,
By Joshua R. H. Potts
his Attorney

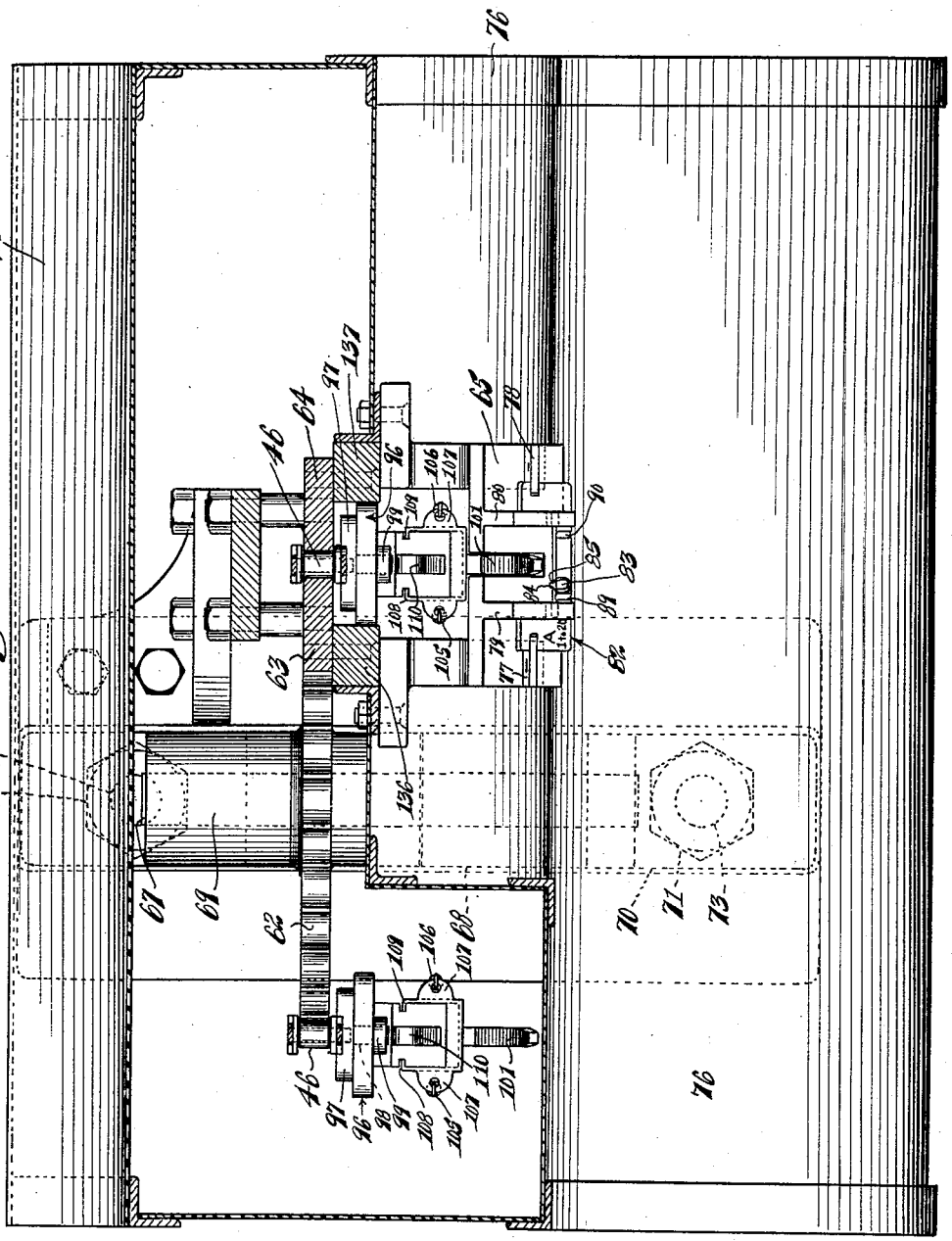

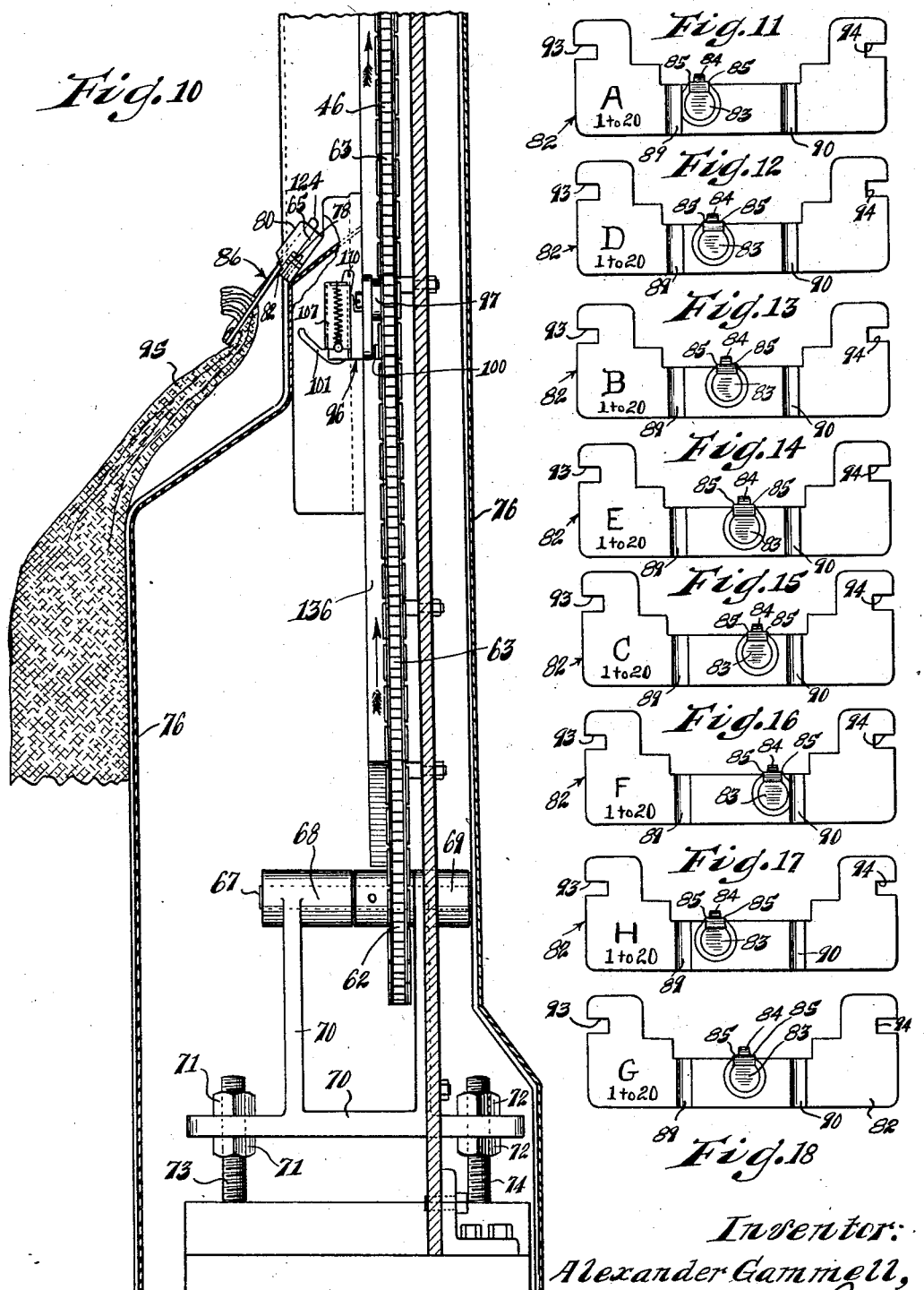

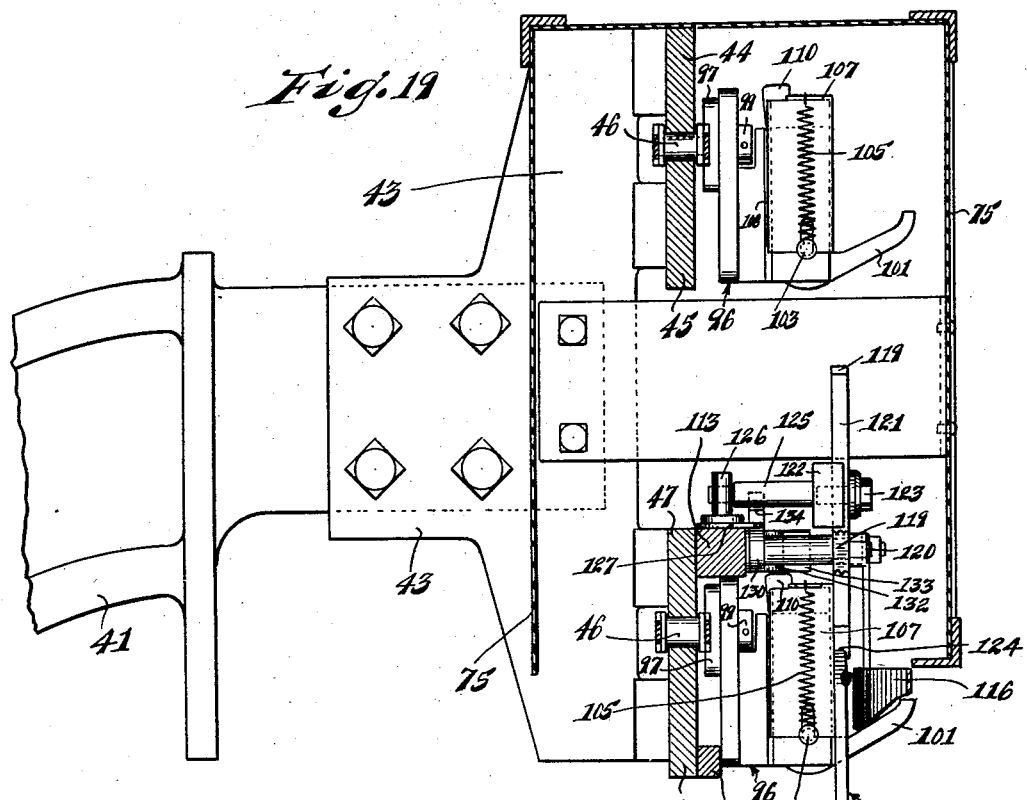
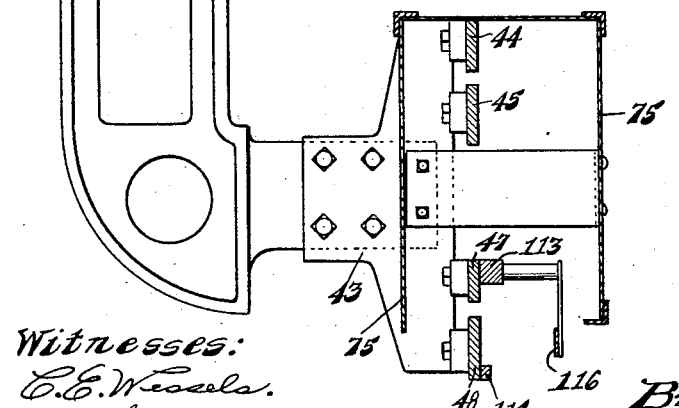

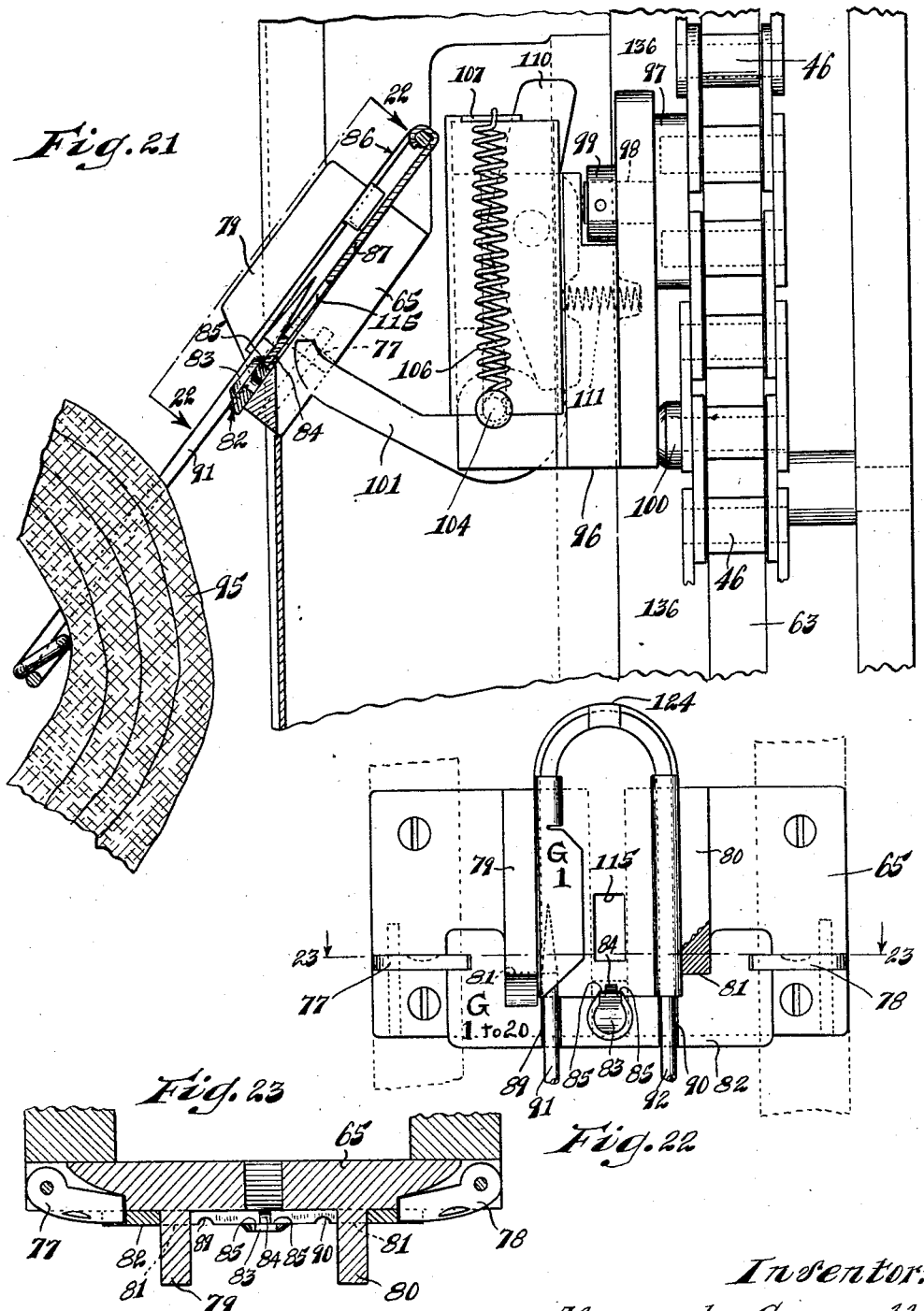

Inventor:
Alexander Gammell,
By Joshua R.H. Potts
his Attorney.

June 2, 1931.   A. GAMMELL   1,808,406
SORTING AND DISTRIBUTING MACHINE
Filed April 12, 1928   11 Sheets-Sheet 11
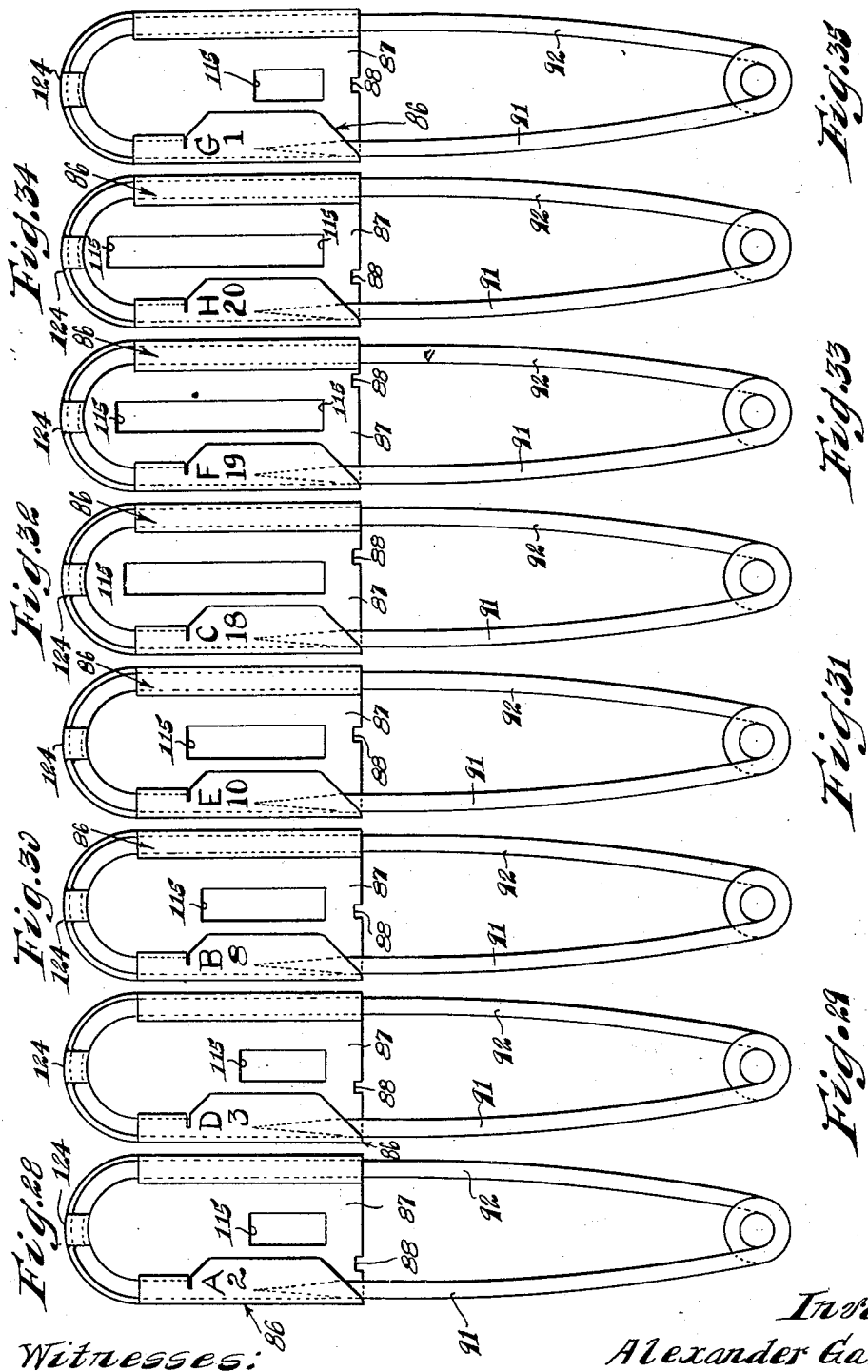
Witnesses:
C. E. Wessels
W. S. Laughlin
Inventor;
Alexander Gammell,
By Joshua R. H. Potts
his Attorney.

Patented June 2, 1931

1,808,406

UNITED STATES PATENT OFFICE

ALEXANDER GAMMELL, OF CHICAGO, ILLINOIS

SORTING AND DISTRIBUTING MACHINE

Application filed April 12, 1928. Serial No. 269,384.

This invention relates to a machine for sorting and distributing articles and has particular applicability to use in laundries where articles or net bags containing laundered articles are attached to identification means. An object of the invention is to provide means for selecting and conveying only articles of a particular identified group and rejecting articles belonging to any other identified group. In addition to the function of so selecting and rejecting articles, a further object resides in the provision of means for automatically distributing each article of a selected group in accordance with the identification member of the particular article. A further object is the provision of an identification member for each article adapted to serve the double purpose of cooperating with other parts of the machine in the selecting or rejecting of articles and also to serve as means for cooperating to cause proper distribution of the article to which it is attached. A further object of the invention is the provision of means for automatically restoring the tripping mechanism to operative position, after each tripping operation in the distribution of the articles. An additional object of the invention is to provide unique means for permitting the selection and conveyance of a particular group of identified articles while rejecting all articles not of that particular identified group, which means is in the form of a plurality of key members, one for each group.

The selection and rejection of articles according to identified groups, in addition to the automatic distribution of the articles in each group, greatly increases the capacity of the machine with relation to its size and enables the operator to exercise less care and thus increase the speed of his work because of the impossibility of having an article engaged by the machine unless it belongs to the particular group previously selected and provided for.

Other objects will appear hereinafter.

The invention consists in the combinations and arrangements of parts hereinafter described and claimed.

The invention will be best understood by reference to the accompanying drawings forming a part of the specification, and in which, Fig. 1 is a front elevational view of the left or loading end of the machine, showing the usual laundry net bag at an initial stage of horizontal conveyance and also showing a few of the receptacles;

Fig. 2 is a front elevational view of the right hand end of the machine;

Fig. 3 is an enlarged elevation of the conveying mechanism and associated parts taken at the commencement of the operative horizontal run of the conveyor chain, and showing one of the tripping devices;

Fig. 4 is a sectional view taken substantially upon the line 4—4 of Fig. 3;

Fig. 5 is an enlarged elevational view taken at the end of the machine horizontally opposite to that shown in Fig. 3;

Fig. 6 is a sectional view taken substantially on line 6—6 of Fig. 5;

Fig. 7 is an enlarged front elevational view showing a portion of the operative horizontal run of the conveyor chain together with a carrier supporting an article identification member and showing also one of the tripping devices as well as a portion of the conveyor chain on its return travel;

Fig. 8 is a sectional view taken on the line 8—8 of Fig. 7;

Fig. 9 is an enlarged sectional view taken on the line 9—9 of Fig. 1;

Fig. 10 is an enlarged vertical sectional view taken on line 10—10 of Fig. 1;

Figure 25:
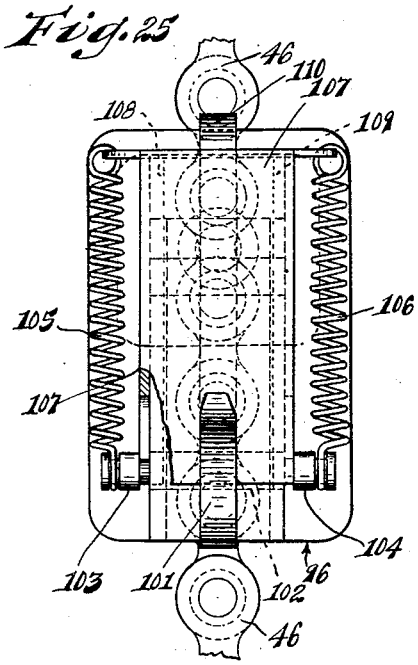
Figure 24:
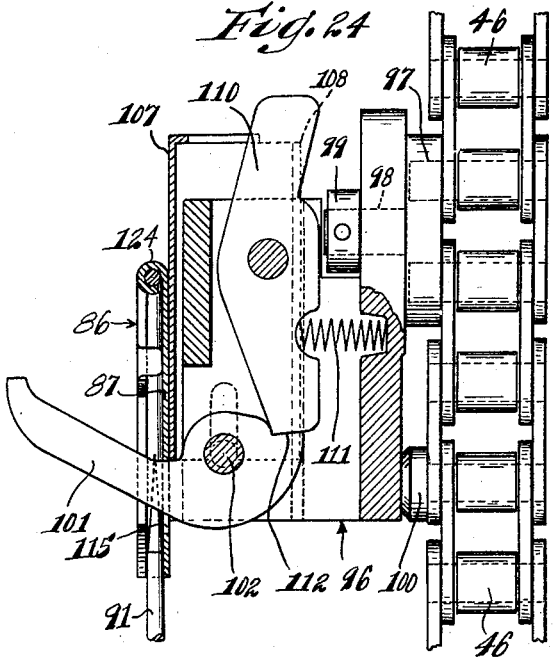
Figure 26:
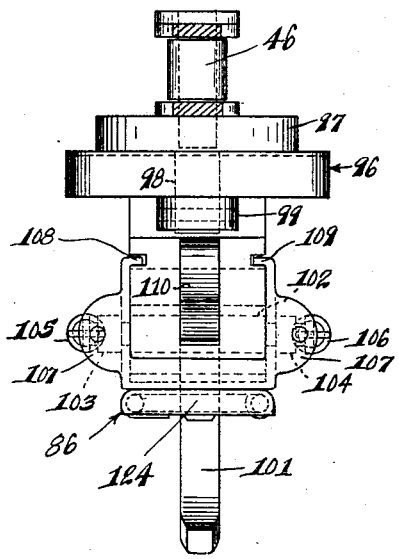
Figure 27:
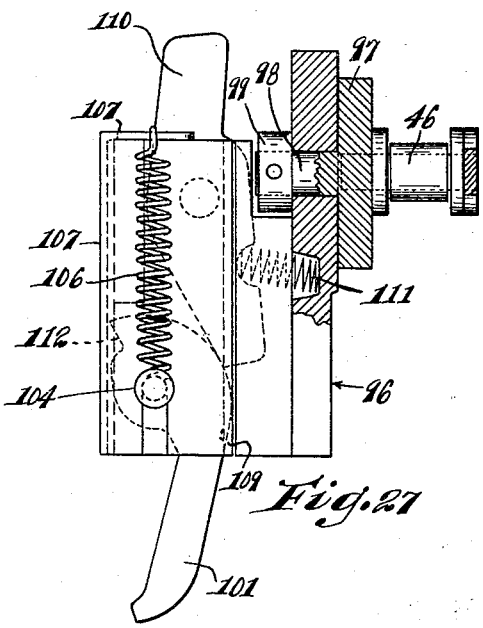

Figs. 11 to 18, inclusive, are face views of a plurality of group or lot keys;

Fig. 19 is an enlarged sectional view taken substantially on the line 19—19 of Fig. 1, showing a carrier and an article identification and attaching member in operative positions on the lower travel of the chain, and showing a carrier on the upper or return travel of the chain;

Fig. 20 shows a modification of the conveyor chain supporting mechanism in the form of a hanger instead of being standard supports as in the other views;

Fig. 21 is an enlarged sectional view taken on the line 21—21 of Fig. 1;

Fig. 22 is a view taken on the line 22—22 of Fig. 21 showing one of the group keys in place supporting a corresponding article identification member;

Fig. 23 is a sectional view taken on the line 23—23 of Fig. 22;

Fig. 24 is an enlarged elevation, partly in section, showing a carrier member in operative position supporting an article attaching member;

Fig. 25 is a front view of the carrier shown in Fig. 24, taken toward the right of Fig. 24;

Fig. 26 is a plan view of the parts shown in Fig. 25;

Fig. 27 is a side elevation showing the carrier immediately following a tripping operation; and Figs. 28 to 35, inclusive, are face views of a plurality of article attaching and identification members.

For illustrative purposes, a sufficient number of operative devices are shown to accommodate and handle articles of eight groups and to provide twenty distributing stations. Thus, Fig. 1 shows the first three distributing receptacles and Fig. 2 shows the two final distributing receptacles, the intervening portions of the machine being the same in construction and operation as the parts shown. It will be apparent that provision may be made for any suitable number of groups of articles and of distribution receptacles as conditions may require.

The receptacles are provided to prevent commingling of the articles in their distribution and referring to Figs. 1 and 2 the receptacles or bins which are marked 1, 2, 3, 18, 19 and 20 may be arranged upon a table or platform 40. Similarly, the upper part of the apparatus containing the distributing conveyor may be supported by standards 41 or, if preferred, by hangers 42 secured overhead as shown in Fig. 20. Bolted to each standard 41 is a bracket 43, to the upper part of which are secured vertically aligned chain guide rails 44 and 45 between which the conveyor chain 46 is adapted to run on its return travel. Similarly mounted on the lower portion of bracket 43, are chain guide rails 47 and 48 adapted to guide the conveyor chain 46 during its horizontal operative travel. The conveyor chain 46 is preferably of the roller type having a cylindrical roller upon each link pin in order to reduce friction and enhance smoothness of operation, and, as will be seen in Fig. 19, the guide rails are spaced apart a distance less than the width of the chain link bars whereby lateral displacement of the chain is prevented.

Power for operating the conveyor chain may be derived from any suitable source such as an electric motor 50 having a drive shaft which projects into gear box 51 containing reduction gearing whereby drive chain 52 is driven at relatively slow speed compared with the speed of the motor. Chain 52 drives sprocket 53 (Fig. 6) the hub of which is pinned to shaft 54 journaled in bearing 55 and into the opposite end of shaft 54 is pinned driving sprocket 56 which carries conveyor chain 46. Chain 46, in the upper return travel, moves between guide rails 44 and 45 and changes direction downwardly over idler sprocket 57 pinned to shaft 58 which rotates in bearing 59 and which is held in place by collar 60, bearing 59 being formed integral with bracket 61. Chain 46 then travels upon idler sprocket 62 thus changing its direction of travel upwardly where it passes between two aligned vertically extending guide rails 63 and 64, similar in arrangement to horizontally extending guide rails 44 and 45. In a convenient location adjacent chain 46 in its upward travel, a loading plate 65 is disposed and chain 46 then travels over idler pulley 66 journaled in bracket 61, commencing its operative horizontal travel which terminates as chain 46 reaches driving sprocket 56 and the circuit completed.

Idler sprocket 62 (Fig. 10) is secured to shaft 67 which rotates in bearings 68 and 69 mounted upon bracket 70. For tightening or loosening the conveyor chain as occasion requires, bracket 70 is adjustable vertically by means of adjusting nuts 71 and 72 threaded upon posts 73 and 74, respectively. If desired, the upper horizontal mechanism may be enclosed in a box-like housing 75 and the vertical portion protected by a similar housing 76.

Loading plate 65 (Figs. 22 and 23) is provided with two pivoted blades 77 and 78 adapted to engage a selected group key member as presently explained, and is also provided with two rib portions 79 and 80 which serve as guides for the form of article attaching and identification member employed in the present embodiment. Further, ribs 79 and 80 are provided with recesses as shown at 81 (Fig. 22) for the purpose of holding a group key 82 in place in conjunction with blades 77 and 78, and for convenience and effectiveness of operation, plate 65 is preferably disposed at an angle as shown in Fig. 21.

Figs. 11 to 18, inclusive, illustrate eight varieties of the group key 82 and each key shown is differentiated from the others by the location of the boss 83 as well as the upwardly projecting rectangular portion 84 and the locking shoulders 85. In the embodiment illustrated, provision has been made for eight groups of articles, which groups are identified by letters A, D, B, E, C, F, H and G, respectively. Correspondingly, as shown in Figs. 28 to 35, inclusive, the article attaching and identification members 86 are shown in the form of laundry net bag safety pins bearing the same identification letters respectively. Each net pin is provided with a keeper plate 87, and a pin of each group is differentiated from the pins of other groups by the location of the notch 88. Grooves 89 and 90 are provided on each group key for reception of wires 91 and 92, respectively, of the appropriate net pin. A given article attaching and identification member 86 in the form of a net bag pin, in the present embodiment, fits upon and is supported by a group key bearing the same identification letter. For example, the pin bearing letter A, shown in Fig. 28, fits upon the group key bearing the same letter shown in Fig. 11, inasmuch as the parts are so conformed that notch 88 passes over the rectangular projection 84, wires 90 and 91 fit into grooves 88 and 89, respectively, and the plate 87 is securely hooked upon the group key by each side of notch 88, being engaged by the adjacent shoulder 85. It will be understood that in operation, a given group key is selected and placed in position upon plate 65, as for example, group key bearing the identification letter G, as shown in Fig. 22. The group key 82 is slid upwardly within recesses 81 on the ribs 79 and 80, and is secured in plate 65 by blades 77 and 78 engaging notches 93 and 94, respectively. In this position, ribs 79 and 80 serve as guides for the pin keeper plate 87, and a pin not belonging to the group corresponding to the particular group key in position on plate 65, can not be hooked in position as shown in Fig. 21 because notch 88 will not register with projection 84 so as to permit each shoulder 85 to engage the adjacent corner of notch 88 on the lower edge of plate 87. In the adaptation shown, each pin 86 is employed to support a laundry net bag 95.

From the foregoing, it will be seen that when a particular group key is secured in place on plate 65, only those net pins which belong to the same identified group can be suspended upon the particular group key, and the pin of a particular group is distinguished from pins of other groups by the location of notch 88 upon the lower edge of plate 87.

At desired spaced intervals, upon the conveyor chain 46, carriers 96 are pivotally suspended so as to hang in a vertical position at all times. These carriers 96 may be located at any desired point on the chain by removing one of the link side plates and substituting two longer pivot pins adapted to be threaded into a substitute link plate 97, as shown in Fig. 24. Plate 97 carries a pivot pin 98 upon which is mounted carrier 96 held in place by collar 99. To prevent displacement of carrier 96 during the vertical travel of the chain, a boss 100 is threaded upon an elongated link pin as shown in Fig. 24. A carrier arm 101 is pivotally mounted upon pin 102 as shown in Fig. 24, and the extensions 103 and 104 of pin 102 are preferably provided with annular grooves to carry springs 105 and 106, respectively, as shown in Fig. 25. The opposite ends of springs 105 and 106 are secured to a cap 107 for the purpose of exerting a downward pull, and cap 107 is provided with inturned flanges 108 and 109, which register with corresponding grooves in carrier 96.

Pivotally mounted within carrier 96 is a trigger lever 110, the lower end of which is pressed outwardly by compression spring 111, and arm 101 is normally maintained in operative position by the lower portion of trigger lever 110 which engages the jaw 112 upon the arm 101. Carrier 96 is maintained in correct vertical position during the horizontal operative run of the conveyor chain 46 by rails 113 and 114, mounted upon guides 47 and 48, respectively, and, similarly, lateral displacement of carrier 96 during its vertical operative travel is prevented by vertically extending rails 136 and 137 between which carrier 96 has a sliding fit.

Referring to Figs. 28 to 35, inclusive, each attaching pin 86 has a slot 115 provided on the plate 87, and to make provision for twenty distributing points as illustrated, these slots 115 are graduated in length one-sixteenth of an inch per each identification number. Thus, the pin shown in Fig. 35 which bears identification number 1 is provided with the shortest slot 115; the pin shown in Fig. 34 which bears identification number 20 is provided with the longest slot 115; slot 115 of the pin shown in Fig. 33 which bears identification number 19 is one-sixteenth of an inch shorter than the slot in the pin of Fig. 34 and the slots of other pins are proportionately graduated in length according to the identification number on the pin.

Chain 46 is adapted to travel at an uniform speed and as a carrier 96 approaches the loading plate 65 as shown in Fig. 21, arm 101 projects through slot 115 and carries member 86 out of engagement with group key 82. Adjacent the commencement of the operative horizontal run of chain 46 is a shifter bar 116 which is curved inwardly, as shown in Fig. 4, and adapted to force the attaching pin 86 downward upon the base of arm 101 in order to insure proper operation of the tripping mechanism as hereinafter explained. The distributing stations may be separated by partitions 117 as shown in Figs. 1 and 2, and above each receptacle is a tripping device 118, shown in Figs. 7 and 8. This device is preferably mounted upon rail 113 and includes an oscillating bar 119 pivotally mounted upon pin 120. A second bar 121 is held in engagement with bar 119 by means of bracket 122 and is slotted as shown in Fig. 7 to permit of vertical adjustability. Further, bar 121 may be secured in any adjusted position by nut 123 and the lower end is beveled as shown in Fig. 7 to facilitate sliding engagement with the top rounded portion 124 of an appropriate attaching pin 86. Extending inwardly from bracket 122 is pin 125 which is straddled by yoke member 126 carried by plate 127. One end of tension spring 128 is secured to yoke member 126 and the other end is secured to post 129 mounted upon rail 113. An arm 130 is pivotally mounted upon pin 120 and is provided with a notch 131 into which plate 127 extends in the position shown in Fig. 7. Arm 130 is provided with cam surfaces 132 and 133 which function to trip the carrier member and restore the tripping device to normal position following a tripping operation, as hereinafter explained. A projection 134 is provided to restrict downward movement of arm 130 as shown in dotted lines in Fig. 7.

It will be seen that the relative height of the rounded portion 124 on a particular attaching pin 86 being carried upon arm 101, depends upon the length of slot 115. Therefore, in the present embodiment, the pin shown in Fig. 35, intended for delivery to number 1 receptacle, will extend upwardly the greatest distance and the pin shown in Fig. 34, intended for distribution to receptacle number 20 will extend upwardly the shortest distance. Inasmuch as the tripping of the carrier 96 is effectuated by engagement of portion 124 with the lower beveled end of bar 121, this bar upon the tripping device above each receptacle is adjusted vertically to insure engagement by portion 124 of the pin intended for distribution to that particular receptacle. Furthermore, inasmuch as the adjustment of bar 121 is progressively downwardly in the device above receptacle number 1 to that above receptacle number 20, no care need be exercised with regard to the order in which different numbered pins are placed upon the loading plate. In order to restore each carrier 96 to operative position after a tripping operation, a horn 135 is mounted adjacent the end of the operative horizontal run of chain 46.

In operation, provision is made for as many groups of articles and as many distributing points as conditions require. The articles to be sorted and distributed are properly identified by attachment of identification members which bears group indicia and also distributing station indicia. A group key is selected and secured in place at the loading point of the machine, and, as above described, the key will permit of engagement of only those identification members bearing a group indicia corresponding to the group indicia on the particular group key. After an article attaching member has been hooked upon a group key as shown in Figs. 21 and 22, it is engaged by the nearest oncoming carrier 96, the arm 101 of which extends through slot 115 of the plate 87. Thereafter, the article is transported by the carrier, and near the commencement of the operative horizontal run member 86 is forced back upon arm 101 by the shifter 116. A tripping device 118 is disposed above each distributing station and when the particular carrier reaches a tripping device for a station corresponding to the station number on the member 86, the top portion 124 of member 86 contacts with the lower beveled end of bar 121 (see Fig. 7) which swings bars 119 and 121 in a counter-clockwise direction upon the pivot 120. This causes pin 125 to move the yoke 126 of the attached plate 127 toward the left, as shown in Figs. 7 and 8. Plate 127 is therefore, pulled out of engagement with notch 131 so that arm 130 drops until projection 134 rests upon plate 127, as shown in dotted lines in Fig. 7, and this operation causes cam surfaces 132 and 133 to lie in the path of trigger lever 110 upon the carrier 96. Cam surface 132 is then engaged by trigger lever 110 which is moved in a counter-clockwise direction, as shown in Fig. 24, until jaw 112 upon arm 101 is released and arm 101 drops downwardly to the position shown in Fig. 27.

In addition to the weight of the article suspended, cap member 107 exerts downward pressure upon arm 101 to insure discharge of the suspended article upon release of the trigger lever 110. Promptly following this tripping operation, cam surfaces 133 of arm 130 is engaged by the top of trigger lever 110 thus forcing arm 130 upwardly until plate 127 is pulled into engagement with notch 131 by spring 128, and the tripping device restored to operative position. When the carrier member 96 reaches horn 135, the latter is so shaped as to exert a camming action upon arm 101 forcing it upwardly until jaw 112 clears the lower end of trigger lever 110 whereupon the carrier is restored to operative position by compression spring 111 forcing lever 110 into engagement with jaw 112, as shown in Fig. 24. It will be seen that the carriers are uniform in construction and any number may be employed. It will further be seen that the apparatus is largely automatic in operation. When it is desired to distribute articles, of a different group, a corresponding group key is substituted. The division of articles into groups in addition to the division by distributing station indicia, greatly increases the range of usefulness of the machine and errors are eliminated, inasmuch as a given group key will engage only articles belonging to the same group.

While I have illustrated and described the preferred form of construction for carrying my invention into effect, this is capable of variation and modification without departing from the spirit of the invention. I therefore, do not wish to be limited to the precise details of construction set forth, but desire to avail myself of such variations and modifications as come within the scope of the appended claims.

Having thus described my invention, what I claim as new and desire to secure by Letters Patent is:

1. A sorting machine comprising, in combination, a conveyor, a plurality of carrier members secured to and adapted to be conveyed by said conveyor, a plurality of distributing stations, a tripping device for each distributing station, a plurality of article identification and attaching members bearing group indicia and station indicia, a plurality of group keys, and loading means adapted to engage one of said group keys, each group key adapted to permit engagement only of article attaching members of a corresponding group.

2. A sorting machine comprising, in combination, a conveyor, a plurality of carrier members each having a carrier arm and a trigger member for releasing said carrier arm, a plurality of distributing stations, a plurality of group keys of distinct conformation for each group, a plurality of article identification members of distinct conformation for each group and station and adapted to be engaged and transported by said carrier members, means for mounting one of said group keys to permit engagement by said carrier members of only article identification members belonging to the same group, a tripping device for each station adapted to engage said trigger member when said tripping device is actuated, means upon each identification member for causing actuation of the tripping device at the station corresponding to the station conformation of said member, and means for restoring carriers engaged by tripping devices to operative position.

3. A sorting machine comprising, in combination, a conveyor, a plurality of carrier members, a plurality of distributing stations, a plurality of group keys each having a projecting portion in a location distinct from the remaining keys, a plurality of article identification members each having a notch adapted to register with the projecting portion on a corresponding group key, and means for mounting one of said group keys to permit engagement by said carrier members of only article identification members having notches which register with the projection on the selected group keys.

4. The combination in a sorting machine, of a conveyor, a plurality of carriers adapted to be conveyed by said conveyor, a plurality of distributing stations, a tripping device for each station, a plurality of group keys differentiated in shape according to group, a plurality of article identification members each provided with a notch corresponding to the associated key and also provided with a slot adapted to cause operation of the associated tripping device, means for mounting a selected group key for permitting engagement by said carriers of only identification members belonging to a corresponding group, and means upon each identification member for causing actuation of the proper tripping device according to the distinct shape as to station of said identification member.

5. The combination in a sorting machine, of a conveyor, a plurality of carrier members, a plurality of distributing stations, a plurality of group keys, a plurality of article identification members each having a slot the length of which determines delivery to a particular station and each shaped to conform with a particular group key, means for mounting a selected group key for permitting engagement by said carriers of only identification members belonging to a corresponding group, and a tripping device for each station adapted to be operated only by identification members having slots of a distinct length.

6. A sorting machine comprising, in combination, a conveyor, a carrier member mounted upon said conveyor, a pivoted carrier arm on said carrier member, a pivoted trigger lever on said carrier member having a portion engaging a jaw on said carrier arm, means for loading an article to be suspended by said carrier arm, and a tripping device having one cam surface for actuating said trigger lever for releasing said article, and a second cam surface engaged by said trigger lever for restoring said tripping device to operative position.

7. A sorting machine comprising, in combination, a conveyor, a carrier member mounted upon said conveyor, a pivoted carrier arm on said carrier member, a pivoted trigger lever on said carrier member having a portion engaging a jaw on said carrier arm, a plurality of articles adapted to be individually engaged by said carrier arm, said articles differing in configuration, and a tripping device adapted to be actuated by the article suspended and having a cam surface adapted to engage said trigger lever to release said article.

8. A sorting machine comprising, in combination, a conveyor, a carrier member mounted upon said conveyor, a pivoted carrier arm on said carrier member, a pivoted trigger lever on said carrier member having a portion engaging a jaw on said carrier arm, means for loading an article to be suspended by said carrier arm, a tripping device adapted to be actuated by the article suspended and having a cam surface adapted to engage said trigger lever to release said article, and means for restoring said carrier arm to operative position.

9. A sorting machine comprising, in combination, a conveyor, a carrier member mounted upon said conveyor, a pivoted carrier arm on said carrier member, a pivoted trigger lever on said carrier member having a portion engaging a jaw on said carrier arm, a slidable cap member on said carrier member engaging said carrier arm when in operative position, a spring connecting said cap and said carrier member, means for loading an article to be suspended by said carrier arm, and means for actuating said trigger lever for releasing said article.

10. A sorting machine comprising, in combination, a conveyor, a carrier member mounted upon said conveyor, a pivoted carrier arm on said carrier member, a pivoted trigger lever on said carrier member having a portion engaging jaw on said carrier arm, means for normally maintaining said trigger lever in engagement with said jaw, means for loading an article to be suspended by said carrier arm, a tripping device, means upon said article for actuating said tripping device, and means upon said tripping device adapted to shift said trigger lever for releasing said carrier arm.

11. A sorting machine comprising, in combination, a conveyor, a carrier member mounted upon said conveyor, a pivoted carrier arm on said carrier member, a pivoted trigger lever on said carrier member having a portion engaging a jaw on said carrier arm, means for normally maintaining said trigger lever in engagement with said jaw, means for loading an article to be suspended by said carrier arm, a tripping device, means upon said article for actuating said tripping device, means upon said tripping device adapted to shift said trigger lever for releasing said carrier arm, and means for restoring said carrier arm to operative position.

12. A sorting machine comprising, in combination, a conveyor, a carrier member mounted upon said conveyor, a pivoted carrier arm on said conveyor member, a pivoted trigger lever on said carrier member having a portion engaging a jaw on said carrier arm, means for normally maintaining said trigger lever in engagement with said jaw, means for loading an article to be suspended by said carrier arm, a tripping device, means upon said article for actuating said tripping device, a cam surface upon said tripping device adapted to shift said trigger lever for releasing said carrier arm, and a second cam surface upon said tripping device adapted to be engaged by said trigger lever for restoring said tripping device to operative position.

13. A sorting machine comprising, in combination, a conveyor, a carrier member mounted upon said conveyor, a pivoted carrier arm on said carrier member, a pivoted trigger lever on said carrier member having a portion engaging a jaw on said carrier arm, means for normally maintaining said trigger lever in engagement with said jaw, means for loading an article to be suspended by said carrier arm, a tripping device, means upon said article for actuating said tripping device, a cam surface upon said tripping device adapted to shift said trigger lever for releasing said carrier arm, a second cam surface upon said tripping device adapted to be engaged by said trigger lever for resorting said tripping device to operative position, and means engaging said carrier arm for restoring said carrier arm to operative position.

14. The combination of a conveyor, a carrier member mounted upon said conveyor, a carrier arm mounted upon said carrier member, a trigger lever pivotally mounted upon said carrier member and adapted to engage said carrier arm, a loading plate adjacent said conveyor, a group key member adapted to be mounted upon said loading plate, and an article identification member adapted to be engaged by said group key plate and also adapted to be suspended and carried by said carrier arm.

15. The combination of a conveyor, a carrier member mounted upon said conveyor, a carrier arm mounted upon said carrier member, a trigger lever pivotally mounted upon said carrier member and adapted to engage said carrier arm, a loading plate adjacent said conveyor, a group key member adapted to be mounted upon said loading plate, an article identification member adapted to be engaged by said group key member and also adapted to be suspended and carried by said carrier arm, and a tripping device adapted to cause said carrier arm to disengage said article identification member.

16. The combination of a conveyor, a loading plate, a group key member adapted to be mounted upon said loading plate, a plurality of article identification members each adapted to be engaged by said group key member, and each provided with a plate having a slotted portion of distinct outline, and a carrier member mounted upon said conveyor and having an arm adapted to engage the slot in said article identification member for suspending and carrying said article identification member.

17. The combination of a conveyor, a loading plate, a group key member adapted to be mounted upon said loading plate, an article identification member adapted to be engaged by said group key member, a carrier member mounted upon said conveyor and adapted to engage a slot in said article identification member, and a shifter bar adapted to slide said article identification member on said carrier arm.

18. The combination of a conveyor, a carrier member pivotally mounted upon said conveyor, a carrier arm pivotally mounted upon said carrier member, a trigger lever pivotally mounted upon said carrier member and adapted to engage said carrier arm, a compression spring interposed between said trigger lever and said carrier member for normally maintaining said trigger lever in engagement with said carrier arm, loading means adapted to support an article to be engaged by said carrier arm, and a tripping device actuated by said article and adapted to shift said trigger lever for releasing said carrier arm.

19. The combination of a conveyor, a carrier member pivotally mounted upon said conveyor, a carrier arm pivotally mounted upon said carrier member, a trigger lever pivotally mounted upon said carrier member and adapted to engage said carrier arm, a compression spring interposed between said trigger lever and said carrier member, a loading plate, a group key member supported upon said loading plate, an article identification member adapted to be engaged and supported by said group key member and having a slot for engagement by said carrier arm, and a tripping device adapted to engage said trigger lever for releasing said carrier arm.

20. The combination of a conveyor, a carrier member pivotally mounted upon said conveyor, a carrier arm pivotally mounted upon said carrier member, a trigger lever pivotally mounted upon said carrier member and adapted to engage said carrier arm, a compression spring interposed between said trigger lever and said carrier member, a loading plate, a group key member supported upon said loading plate, an article identification member adapted to be engaged and supported by said group key member and having a slot for engagement by said carrier arm, a tripping device actuated by said article identification member for releasing said carrier arm, and means for restoring said carrier arm to operative position.

21. The combination of a conveyor, a carrier member pivotally mounted upon said conveyor, a carrier arm pivotally mounted upon said carrier member, a trigger lever pivotally mounted upon said carrier member and adapted to engage said carrier arm, a compression spring interposed between said trigger lever and said carrier member, a loading plate, a group key member supported upon said loading plate, an article identification member adapted to be engaged and supported by said group key member and having a slot for engagement by said carrier arm, a tripping device adapted to be actuated by said article identification member and having a cam surface adapted to engage said trigger lever for releasing said carrier arm, and means for restoring said tripping device to operative position.

22. The combination of a conveyor, a carrier member pivotally mounted upon said conveyor, a carrier arm pivotally mounted upon said carrier member, a trigger lever pivotally mounted upon said carrier member and adapted to engage said carrier arm, a compression spring interposed between said trigger lever and said carrier member, a loading plate, a group key member supported upon said loading plate, an article identification member adapted to be engaged and supported by said group key member and having a slot for engagement by said carrier arm, a tripping device adapted to be actuated by said article identification member and having a cam surface adapted to engage said trigger lever for releasing said carrier arm, means for restoring said tripping device to operative position, and means for restoring said carrier arm to operative position.

23. The combination of a conveyor, a carrier member pivotally mounted upon said conveyor, a carrier arm pivotally mounted upon said carrier member, a trigger lever pivotally mounted upon said carrier member and adapted to engage said carrier arm, a compression spring interposed between said trigger lever and said carrier member, a loading plate, a group key member supported upon said loading plate, an article identification member adapted to be engaged and supported by said group key member and having a slot for engagement by said carrier arm, a tripping device adapted to be actuated by said article identification member, a cam surface on said tripping device adapted to engage said trigger lever for releasing said carrier arm, and a second cam surface on said tripping device adapted to be engaged by said trigger lever for restoring said tripping device to operative position.

24. The combination of a conveyor, a carrier member pivotally mounted upon said conveyor, a carrier arm pivotally mounted upon said carrier member, a trigger lever pivotally mounted upon said carrier member and adapted to engage said carrier arm, a compression spring interposed between said trigger lever and said carrier member, a loading plate, a group key member supported upon said loading plate, an article identification member adapted to be engaged and supported by said group key member and having a slot for engagement by said carrier arm, a tripping device adapted to be actuated by said article identification member, a cam surface on said tripping device adapted to engage said trigger lever for releasing said carrier arm, a second cam surface on said tripping device adapted to be engaged by said trigger lever for restoring said tripping device to operative position, and a stationary member adapted to engage and restore said carrier arm to operative position.

25. The combination of a conveyor, a loading plate, a group key member adapted to be mounted upon said loading plate, a plurality of article identification members each adapted to be engaged by said group key member, and each provided with a plate having a slotted portion of distinct outline, a carrier member mounted upon said conveyor and having an arm adapted to engage the slot in said article identification member for suspending and carrying said article identification member, and a tripping device adapted to be engaged by the particular article identification member carried to release said article identification member.

In testimony whereof I have signed my name to this specification.

ALEXANDER GAMMELL.